(12) United States Patent
Hepermann

(10) Patent No.: US 10,337,602 B2
(45) Date of Patent: Jul. 2, 2019

(54) MULTI-STAGE PLANETARY GEAR MECHANISM FOR A WIND TURBINE, COMPRISING A SPECIAL LUBRICANT GUIDE

(71) Applicant: ZF FRIEDRICHSHAFEN AG, Friedrichshafen (DE)

(72) Inventor: Paul Philip Hepermann, Witten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/760,685

(22) PCT Filed: Aug. 24, 2016

(86) PCT No.: PCT/EP2016/069937
§ 371 (c)(1),
(2) Date: Mar. 16, 2018

(87) PCT Pub. No.: WO2017/045883
PCT Pub. Date: Mar. 23, 2017

(65) Prior Publication Data
US 2018/0274663 A1 Sep. 27, 2018

(30) Foreign Application Priority Data
Sep. 18, 2015 (DE) .................. 10 2015 217 906

(51) Int. Cl.
*F16H 57/04* (2010.01)
*F16H 1/46* (2006.01)
(Continued)

(52) U.S. Cl.
CPC ......... *F16H 57/0479* (2013.01); *F03D 15/00* (2016.05); *F03D 80/70* (2016.05);
(Continued)

(58) Field of Classification Search
None
See application file for complete search history.

(56) References Cited

U.S. PATENT DOCUMENTS 7,214,157 B2 * 5/2007 Flamang .............. F16H 57/043
475/159
8,128,525 B2 * 3/2012 Dinter ................. F16H 57/0427
475/159
(Continued)

FOREIGN PATENT DOCUMENTS

DE 102009031320 A1 3/2011
DE 102013217950 A1 3/2015
(Continued)

*Primary Examiner* — Dirk Wright
(74) *Attorney, Agent, or Firm* — Leydig, Voit & Mayer, Ltd

(57) ABSTRACT

A multi-stage planetary transmission for a wind turbine includes a transmission housing having an oil supply channel disposed therein; an input-side first planetary stage disposed in the transmission housing; at least one second planetary stage disposed downstream of and connected to the first planetary stage by a spline of a sun gear shaft of the first planetary stage; a first oil conducting channel supplied by the oil supply channel and configured to supply oil to planetary gear bearings of the first planetary stage; a second oil conducting channel supplied by the oil supply channel and disposed so as to pass through a planet carrier of the second planetary stage at least partially in an axial direction, the second oil conducting channel configured to supply oil to planetary gear bearings of the second planetary stage; and a third oil conducting channel supplied by the oil supply channel.

10 Claims, 1 Drawing Sheet

(51) Int. Cl.
 *F03D 15/00* (2016.01)
 *F03D 80/70* (2016.01)
(52) U.S. Cl.
 CPC ............ *F16H 1/46* (2013.01); *F16H 57/043* (2013.01); *F16H 57/0424* (2013.01); *F16H 57/0482* (2013.01); *F16H 57/0486* (2013.01); *F05B 2260/40311* (2013.01); *F05B 2260/98* (2013.01)

(56) References Cited

U.S. PATENT DOCUMENTS

| | | | |
|---|---|---|---|
| 8,529,391 B2 * | 9/2013 | Degeling | F16H 37/041 |
| | | | 475/159 |
| 8,632,437 B2 * | 1/2014 | Dinter | F03D 15/10 |
| | | | 475/347 |
| 9,051,922 B2 * | 6/2015 | Boing | F03D 15/00 |
| 9,797,504 B2 * | 10/2017 | Hidding | F16H 1/48 |
| 10,145,363 B2 * | 12/2018 | Li | F03D 80/70 |
| 2010/0160104 A1 | 6/2010 | Dinter et al. | |
| 2013/0130858 A1 | 5/2013 | Degeling et al. | |
| 2016/0223073 A1 | 8/2016 | Deitmers et al. | |

FOREIGN PATENT DOCUMENTS

| | | | | |
|---|---|---|---|---|
| EP | 2199607 A2 | 6/2010 | | |
| EP | 2280193 A2 | 2/2011 | | |
| EP | 2594789 A1 | 5/2013 | | |
| EP | 1431575 B1 * | 4/2015 | ......... | F16H 57/0421 |

\* cited by examiner

MULTI-STAGE PLANETARY GEAR MECHANISM FOR A WIND TURBINE, COMPRISING A SPECIAL LUBRICANT GUIDE

CROSS REFERENCE TO RELATED APPLICATIONS

This application is a U.S. National Stage Application under 35 U.S.C. § 371 of International Application No. PCT/EP2016/069937 filed on Aug. 24, 2016, and claims benefit to German Patent Application No. DE 10 2015 217 906.0 filed on Sep. 18, 2015. The International Application was published in German on Mar. 23, 2017, as WO 2017/045883 A1 under PCT Article 21(2).

FIELD

The present invention relates to wind turbines, and more particularly to multi-stage planetary transmissions for wind turbines.

BACKGROUND

Multi-stage planetary transmissions can be used in wind turbines for stepping up the rotational movement of a rotor to which wind is admitted in order to drive a generator for generating electrical energy. Since higher-power planetary transmissions of this kind are exposed to high loads during operation, a sufficiently reliable supply of oil to the bearings inside the transmission should be ensured. If a plurality of transmission stages are coupled together by a spline, the region of the spline should also be adequately lubricated and rinsed with oil in order to reliably remove wear particles from the region of the spline.

EP 2 280 193 A2 discloses a multi-stage planetary transmission for industrial applications, in which an input-side first planetary stage is coupled to a downstream second planetary stage by a spline. The spline is formed by an end external toothing on the sun shaft of the first planetary stage which engages with an internal toothing, corresponding thereto, in a receiving bushing of the planet carrier. The spur gear stage on the transmission output side is connected downstream of the second planetary stage, which spur gear stage is also coupled via a spline.

In order to supply lubricating oil to the bearings inside the transmission and to the splines, an intricate network of oil conducting channels inside the transmission is provided, which channels are interconnected in part and are formed in the planet carriers, the connecting shafts and on fixed housing portions using intermediate rotary transmission leadthroughs. For example, the region of the spline between the second planetary stage and the spur gear stage on the transmission output side is guided via an oil supply channel that passes axially through an input shaft of the spur gear stage, an adjoining pipe expansion joint, to the lubricant supply channel portion in the region of the receiving bushing of the spline. At the end, lubricating oil is supplied via a nozzle which sprays lubricating oil in a direction oblique to the spline. Rinsing of the spline region with a high lubricating oil flow rate cannot be achieved by this solution. Moreover, the intricate network of oil conducting channels inside the transmission requires significant manufacturing outlay.

EP 2 199 607 A2 discloses a generic multi-stage planetary transmission that uses fewer and shorter oil conducting channels for supplying oil to the planetary gear bearings of the two planetary stages and to the intermediate spline compared with the prior art discussed above. For this purpose, an oil supply channel is provided that is fixed in the transmission housing and is connected, by means of a plurality of oil conducting channels guided through one of the side faces of the planet carrier, to oil conducting channels that are guided through the shafts of all the planetary gears and are open towards the planetary gear bearings. In this case, the fixed oil supply channel penetrates an insert ring fastened thereto, which ring is L-shaped in cross section and on the radial limb of which an upper rotary transmission leadthrough to the planet carrier of the first planetary stage, rotating relative thereto, is formed. A further rotary transmission leadthrough to the planet carrier of the second planetary stage is formed on the underside of the radial portion. Said further rotary unit opens into a further oil conducting channel on the side of the planet carrier of the second planetary stage, which channel finally opens into the region of the planetary gear bearings of the second planetary stage in order to lubricate said bearings. In contrast, the spline between the two planetary stages is formed by a spray head that extends in the radial direction and is attached to a horizontal portion of the insert ring. Effective rinsing of the region of the spline cannot be achieved by this technical solution either.

SUMMARY

In an embodiment, the present invention provides a multi-stage planetary transmission for a wind turbine. The transmission includes a transmission housing having an oil supply channel disposed therein; an input-side first planetary stage disposed in the transmission housing; at least one second planetary stage disposed downstream of and connected to the first planetary stage by a spline of a sun gear shaft of the first planetary stage; a first oil conducting channel supplied by the oil supply channel and configured to supply oil to planetary gear bearings of the first planetary stage; a second oil conducting channel supplied by the oil supply channel and disposed so as to pass through a planet carrier of the second planetary stage at least partially in an axial direction, the second oil conducting channel configured to supply oil to planetary gear bearings of the second planetary stage; and a third oil conducting channel supplied by the oil supply channel and configured to supply oil to the spline. In order to supply oil to the spline, the third oil conducting channel branches off, in a radial direction, from the second oil conducting channel, wherein the second conducting channel is longer than the third oil conducting channel, in order to open into the region of the spline.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
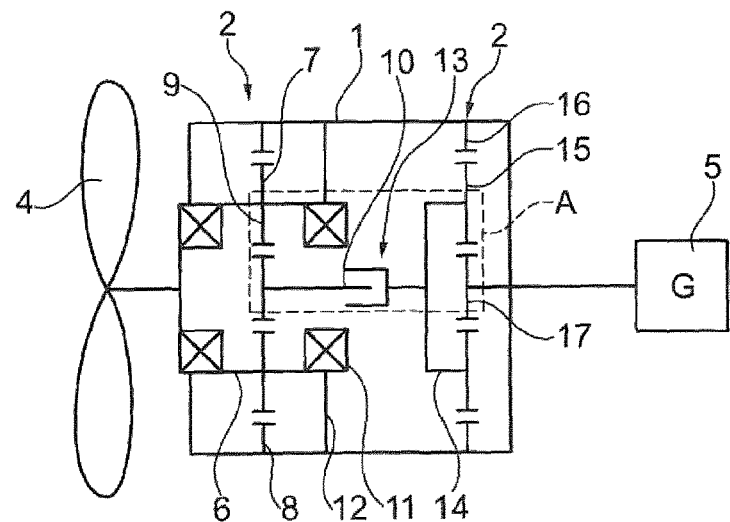
FIG. 1 is a schematic side view of a multi-stage planetary transmission for a wind turbine according to an embodiment of the invention, comprising the connection assemblies.

Embodiments of the present invention provide for improvements with respect to a generic multi-stage planetary transmission in terms of the oil supply thereof inside the transmission, in such a way as to allow effective lubrication by hydraulic oil for rinsing the spline, as well as a supply of oil to the planetary gear bearings, using fewer components and in a manner requiring little manufacturing outlay.

Embodiments of the present invention provide multi-stage planetary transmissions for wind turbines, comprising an input-side first planetary stage that is accommodated in a common transmission housing and downstream of which at least one second planetary stage is connected by means of a spline of a sun gear shaft of the first planetary stage, and, proceeding from a fixed oil supply channel that is formed in the transmission housing, a first oil conducting channel that is supplied by said oil supply channel being provided for supplying oil to the planetary gear bearings of the first planetary stage, a second oil conducting channel that is supplied by said oil supply channel being provided for supplying oil to the planetary gear bearings of the second planetary stage, and a third oil conducting channel that is supplied by said oil supply channel being provided for supplying oil to the spline.

An embodiment of the present invention provides, in order to supply oil to the spline, one oil conducting channel that branches off, in the radial direction, from the oil conducting channel for supplying oil to the planetary gear bearings of the second planetary stage which passes through the planet carrier of the second planetary stage in the axial direction at least in part and is longer than said other oil conducting channel, in order to open into the region, preferably the distal end region, of the spline.

An embodiment of the invention can provide for truly thorough rinsing, and thus effective removal of wear particles, by means of omitting a nozzle or spray head for supplying oil to the spline. For this purpose, the oil conducting channel system is oriented such that an oil conducting channel branching off just a short distance in the radial direction towards the end region of the spline is sufficient to convey some of the lubricating oil under pressure to the region of the spline. The lubricating oil flows through the spline from the distal end region and is discharged at the opposing side of the spline in order to be returned to the oil circuit.

According to a preferred embodiment of the multi-stage planetary transmission, the end, externally toothed, sun shaft of the first planetary stage engages, via the spline, with an internally toothed receiving bushing portion of the planet carrier of the second planetary stage. In this case, the second oil conducting channel preferably first branches off in the radial direction from the fixed oil conducting channel, and then extends, in the axial direction, through the internally toothed receiving bushing portion of the planet carrier of the second planetary stage. The third oil conducting channel, to which the invention relates, branches off therefrom, in the radial direction, towards the distal end region of the spline.

According to a preferred embodiment, in the second planetary stage, the second oil conducting channel transitions, in a manner offset from the third oil conducting channel, into a likewise radial channel portion for supplying oil to the planetary gear bearings in said second stage. Alternatively thereto, it is also possible, however, for said radial channel portion to also extend towards the second planetary stage in alignment with the radial third oil conducting channel that is used for lubricating the spline with hydraulic oil. In this case, just one radial through-hole through the planet carrier is sufficient.

According to an embodiment of the invention, in order to supply oil to the planetary gear bearings of the first planetary stage, the first oil conducting channel provided therefor branches off from the fixed oil supply channel in the axial direction and leaves through the planet carrier of the first planetary stage in order to supply oil to the planetary gear bearings located there. As a result, it is possible to achieve common and compact oil supply of the first planetary stage too.

According to an embodiment of the invention, the branching point of the first and second oil conducting channel from the fixed oil supply channel is formed by an oil distributor ring that acts as a component of the rotary transmission leadthrough, is arranged at the end of the oil conducting channel, and is preferably fastened in the end region of a housing portion that extends towards the inside of the transmission. It should be noted that this specific rotary transmission leadthrough via the oil distributor ring can also be formed, independently of the above-described specific oil supply to the spline, by means of the third oil conducting channel in the generic multi-stage planetary transmission.

The specific oil distributor ring preferably has a substantially rectangular external cross section and an internal T-shaped channel cross section in order to form the branching points of the first and second oil conducting channel in the axial and radial directions, respectively. The simple geometric shape means that this specific oil distributor ring, which preferably consists of bronze, is easy to manufacture. At the same time, the specific oil distributor ring also forms two rotary transmission leadthroughs, specifically in the axial direction towards the first oil conducting channel, and in the radial direction towards the second oil conducting channel. The functionally integrated oil distributor ring requires little installation space inside the planetary transmission.

According to FIG. 1, a multi-stage planetary transmission for a wind turbine substantially consists of an input-side first planetary stage 2 that is accommodated in a transmission housing 1, and a second planetary stage 3 that is connected downstream of said first planetary stage. The multi-stage planetary transmission is connected, at the input side, to a rotor 4 to which wind is admitted. The transmission output of the planetary transmission is connected to a generator 5 for generating electrical energy. The first planetary stage 2 comprises a planet carrier 6 that is connected, on the drive side, to the rotor 4 to which wind is admitted. Planetary gears 7 (by way of example) are rotatably mounted on the planet carrier 6 by means of rolling bearings (not shown in greater detail) and mesh with an internal gear 8 that is fixed to the transmission housing 1. The planetary gears 7 also mesh with a central sun gear 9, from which a sun gear shaft 10 extends on the output side of the first planetary stage 2. The planet carrier 6 is inter alia mounted by means of a rolling bearing 11, relative to the fixed transmission housing 1, by means of a radially inwardly extending housing portion 12. Not all of the roller bearings inside the transmission are shown in this schematic drawing.

The first planetary stage 2 is connected to the second planetary stage 3 by means of a spline 13. The coupling is achieved via a planet carrier 14 of the second planetary stage 3, the planetary gears 15 (by way of example) of which stage mesh both with an internal gear 16 that is fixed to the housing and with a central sun gear 17 to which the generator 5 for generating electrical energy is connected in this embodiment.

Figure 2:
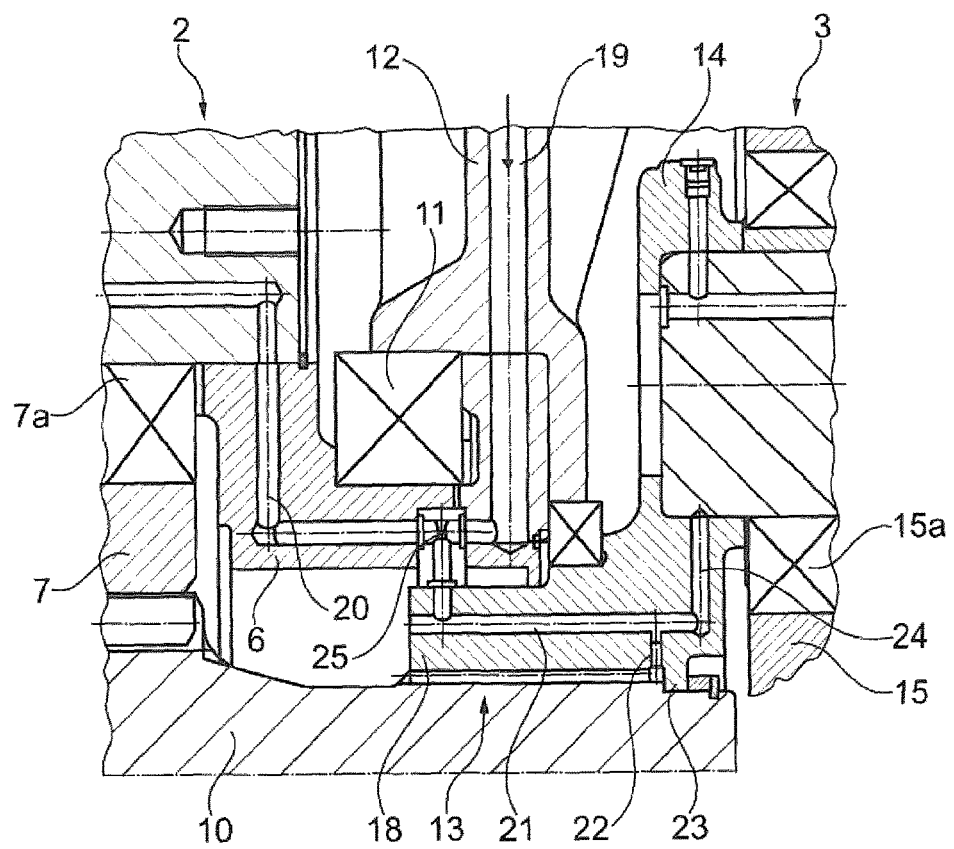
FIG. 2 is a detailed sectional view of the detail A from FIG. 1 in order to illustrate the oil conducting channel structure.

According to FIG. 2, which approximately illustrates the region of detail A from FIG. 1, the spline 13 between the first planetary stage 2 and the second planetary stage 3 is formed by the end, externally toothed sun gear shaft 10 of the first planetary stage 2 which engages with an internally toothed receiving bushing portion 18 on the side of the planet carrier 14 of the second planetary stage 3.

An oil supply channel 19 to which hydraulic oil is applied from the outside extends through the housing rib 12 of the transmission housing 1 (not shown in greater detail here). A first oil conducting channel 20 for supplying oil to the planetary gear bearings 7a of the first planetary stage 2 branches off from the oil supply channel 19. In addition, a second oil conducting channel 21 for supplying oil to the planetary gear bearings 15a of the second planetary stage 3 branches off from the oil supply channel 19. In order to supply oil to the spline 13, a short, third oil conducting channel 22 is also provided, which third channel branches off in the radial direction from the second oil conducting channel 21 which passes through the receiving bushing portion 18 of the planet carrier 14 in the axial direction. The end of the third oil conducting channel 22 opens out beside an axial stop 23 in an annular chamber that extends around the distal end region of the sun gear shaft 10, which stop is molded onto the planet carrier 14. The lubricating oil introduced into the planetary transmission by means of the oil supply channel 19 is thus introduced into the annular chamber via the second oil conducting channel 18 and the third oil conducting channel 22 that branches off therefrom, from which annular chamber the spline 13 is rinsed axially and freed of wear particles.

The second oil conducting channel 21 branches off in the radial direction from the fixed oil supply channel 19, and then extends in the axial direction along the internally toothed receiving bushing portion 18 of the planet carrier 14 of the second planetary stage 3. In the second planetary stage 3, the second oil conducting channel 21 transitions into a radial channel portion 24 for supplying oil to the planetary gear bearings 15a there. In this embodiment, the radial channel portion 24 of the second oil conducting channel 21 is offset in the axial direction relative to the radial third oil conducting channel 22.

The first oil conducting channel 20 also branches off from the fixed oil supply channel 19 and is guided through the planet carrier 6 of the first planetary stage 2 and towards the planetary gear bearings 7a there in order to supply oil to said bearings.

The branching point of the first and second oil conducting channel 20 and 21 from the fixed oil supply channel 19 is formed by an oil distributor ring 25 that acts as a component of a rotary transmission leadthrough and is attached to the housing rib 12 at the end of the fixed oil supply channel 19.

The oil distributor ring 25 has a rectangular external cross section and is provided with an internal T-shaped channel cross section in order to form the branching points to the first and second oil conducting channel 20 and 21 in the axial and radial directions, respectively.

It is also possible, for example, to form the third oil conducting channel 22 in alignment with the radial channel portion 24 of the second oil conducting channel 21. Depending on the prevailing space conditions, one of the technical alternatives described herein can be used. Moreover, the oil conducting channels described herein can also comprise further branching points or outlet openings comprising nozzles, in order to possibly also supply lubricating oil to other housing components.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 transmission housing
2 first planetary stage
3 second planetary stage
4 rotor
5 generator
6 planet carrier
7 planetary gear
8 internal gear
9 sun gear
10 sun gear shaft
11 rolling bearing
12 housing rib
13 spline
14 planet carrier
15 planetary gear
16 internal gear
17 sun gear
18 receiving bushing portion
19 oil supply channel
20 first oil conducting channel
21 second oil conducting channel
22 third oil conducting channel
23 axial stop
24 radial channel portion
25 oil distributor ring

The invention claimed is:

1. A multi-stage planetary transmission for a wind turbine, comprising:
 a transmission housing having an oil supply channel disposed therein;
 an input-side first planetary stage disposed in the transmission housing;

at least one second planetary stage disposed downstream of and connected to the first planetary stage by a spline of a sun gear shaft of the first planetary stage;

a first oil conducting channel supplied by the oil supply channel and configured to supply oil to planetary gear bearings of the first planetary stage;

a second oil conducting channel supplied by the oil supply channel and disposed so as to pass through a planet carrier of the second planetary stage at least partially in an axial direction, the second oil conducting channel configured to supply oil to planetary gear bearings of the second planetary stage; and a third oil conducting channel supplied by the oil supply channel and configured to supply oil to the spline, wherein, in order to supply oil to the spline, the third oil conducting channel branches off, in a radial direction, from the second oil conducting channel, wherein the second conducting channel is longer than the third oil conducting channel, in order to open into the region of the spline.

2. The multi-stage planetary transmission according to claim 1, wherein an end, externally toothed sun gear shaft of the first planetary stage is configured to engage with an internally toothed receiving bushing portion of the planet carrier of the second planetary stage by the spline .

3. The multi-stage planetary transmission according to claim 2, wherein the second oil conducting channel branches off in the radial direction from the fixed oil supply channel and extends in the axial direction through the internally toothed receiving bushing portion of the planet carrier of the second planetary stage.

4. The multi-stage planetary transmission according to claim 3, wherein, in the second planetary stage, the second oil conducting channel transitions into a radial channel portion for supplying oil to the planetary gear bearings of the second planetary stage.

5. The multi-stage planetary transmission according to claim 4, wherein the radial channel portion of the second oil conducting channel is offset in the axial direction relative to the third oil conducting channel.

6. The multi-stage planetary transmission according to claim 4, wherein the radial channel portion of the second oil conducting channel is in alignment with the third oil conducting channel.

7. The multi-stage planetary transmission according to claim 1, wherein the first oil conducting channel branches off from the fixed oil supply channel in the axial direction and extends through a planet carrier of the first planetary stage in order to supply oil to the planetary gear bearings of the first planetary stage.

8. The multi-stage planetary transmission according to claim 1, wherein a branching point of at least one of the first and second oil conducting channels from the fixed oil supply channel is formed by an oil distributor ring that acts as a component of a rotary transmission leadthrough and is arranged at an end of the fixed oil supply channel.

9. The multi-stage planetary transmission according to claim 8, wherein the oil distributor ring has a substantially rectangular external cross section and an internal T-shaped channel cross section in order to form branching points of the first and second oil conducting channels in the axial and radial directions, respectively.

10. The multi-stage planetary transmission according to claim 1, wherein the third oil conducting channel opens out in an annular chamber that extends around the distal end region of the sun gear shaft.

\* \* \* \* \*